United States Patent
Kim

[19]

[11] Patent Number: 5,981,926
[45] Date of Patent: Nov. 9, 1999

[54] ROASTING SPIT FOR A MICROWAVE OVEN

[75] Inventor: Dae-rae Kim, Kyungki-do, Rep. of Korea

[73] Assignee: Samsung Electronics, Co., Ltd., Kyungki-Do, Rep. of Korea

[21] Appl. No.: 09/020,858

[22] Filed: Feb. 9, 1998

[30]  Foreign Application Priority Data

Jul. 12, 1997 [KR] Rep. of Korea ..................... 97-32411

[51] Int. Cl.⁶ .............................. H05B 6/80; A47J 37/04
[52] U.S. Cl. ........................... 219/732; 219/762; 99/419; 99/421 R; 99/DIG. 14
[58] Field of Search .................................. 219/725, 732, 219/762; 99/419, 421 R, 421 HH, 421 HV, 421 V, DIG. 14

[56]  References Cited

U.S. PATENT DOCUMENTS

| | | | |
|---|---|---|---|
| 1,308,253 | 7/1919 | Oftedahl | 99/419 |
| 2,458,239 | 1/1949 | Barlett | 99/419 |
| 3,713,378 | 1/1973 | West et al. | 99/419 |
| 4,481,874 | 11/1984 | Greck | 99/419 |
| 4,896,011 | 1/1990 | Trucks | 219/725 |
| 4,924,768 | 5/1990 | Jay | 99/419 |
| 5,814,795 | 9/1998 | Kim et al. | 219/732 |

*Primary Examiner*—Philip H. Leung
*Attorney, Agent, or Firm*—Burns, Doane, Swecker & Mathis, L.L.P.

[57] ABSTRACT

Disclosed a roasting spit which is used for cooking meat such as chicken or turkey in a microwave oven. The roasting spit for a microwave oven comprises a ring-shaped support member disposed on a tray and including a horizontal coupling portion formed at one end thereof to be bent toward the center of the support member, and a vertical coupling portion formed at an other end of the support member to be multi-bent upward, and a pin member for stabbing a roasting material, the pin member being provided with an coupling hole formed at lower end thereof, thereby the pin member being selectively coupled with the horizontal coupling portion and the vertical coupling portion. When the roasting spit is not used, the pin member can be coupled with the horizontal coupling portion, so as to guarantee a safe packing with less expense and as well greatly reduce the package size.

10 Claims, 8 Drawing Sheets

ROASTING SPIT FOR A MICROWAVE OVEN

BACKGROUND OF THE INVENTION

1. Field of the Invention

The present invention relates to a microwave oven, and more particularly to a roasting spit which is used for cooking meat such as chicken or turkey in a microwave oven.

2. Prior Arts

In general, a microwave oven, an inner construction of which is schematically shown in FIG. 1, is an appliance for cooking food by a microwave stirring method using a microwave generated from a magnetron.

Referring to FIG. 1, the microwave oven as described above includes a housing 1 which encloses a cooking chamber 2 for cooking food therein and an operating chamber 3 for providing microwave and heat from a heater 7 into cooking chamber 2. Cooking chamber 2 and operating chamber 3 are separated from each other by an inner panel 4.

A tray 5, on which a container for food is loaded, is disposed on the floor of cooking chamber 2, while heater 7 is disposed at the top of cooking chamber 2. A driving motor 6 for rotating tray 5 at a lower speed is disposed under tray 5.

A magnetron 8 for generating microwave and a high voltage transformer (not shown) are disposed in operating chamber 3, and a guide tube 9 is provided between magnetron 8 and cooking chamber 2. Guide tube 9 guides and stirs the microwave generated from magnetron 8 into cooking chamber 2 to be dispersed therein.

In the microwave oven as described above, according to a choice on the menu by a user, the microwave generated from magnetron 8 is guided through guide tube 9 into cooking chamber 2, and food in cooking chamber 2 is also heated by heat from heater 7. Simultaneously, driving motor 6 rotates tray 5 at a low constant speed, so as to uniformly disperse the microwave into the food, thereby uniformly cooking the food.

Meanwhile, the microwave oven as described above may further include various supplementary devices according to the types of the food to be cooked by the oven. For example, a roasting spit 10 is such a supplementary device for roasting chicken.

As shown in FIG. 2, roasting spit 10 includes a ring-shaped support member 11 and a pin 12. Support member 11 is set on a tray 5 in close contact therewith, and pin 12 is multi-bent from one end of support member 11 and then extends upward so as to hang the roasting material to be roasted by stabbing therethrough. The upper end of pin 12 is formed sharp as shown, so that the roasting material can be stabbed easily.

After the roasting material is stabbed with and hung on roasting spit 10 and support member 11 is set on tray 5, the roasting material or the food is cooked on tray 5 rotating at a low constant speed.

However, conventional roasting spit 10 as described above has several drawbacks as follows. That is, in conventional roasting spit 10 made by bending a thin and long single rod-shaped member, since pin 12 extends upwards to a high elevation and the upper end of pin 12 is sharp, safety for a user is not guaranteed. Further, when roasting spit 10 is distributed to consumers as a commercially available product, not only too large case is required for packing roasting spit 10 but also too much expense is necessary for the safe packing.

SUMMARY OF THE INVENTION

The present invention has been made to overcome the above described problems of the prior arts, and accordingly it is an object of the present invention to provide a roasting spit for a microwave oven, which includes separable members respectively for stabbing a roasting material and for being set on a tray, thereby eliminating the possibility of accident of a user.

To achieve the above object, the present invention provides a roasting spit for a microwave oven comprising a ring-shaped support member disposed on a tray and including a horizontal coupling portion formed at one end thereof to be bent toward the center of the support member, and a vertical coupling portion formed at an other end of the support member to be multi-bent upward, and a pin member for stabbing a roasting material, the pin member being provided with an coupling hole formed at lower end thereof, thereby the pin member being selectively coupled with the horizontal coupling portion and the vertical coupling portion.

According to the present invention, the coupling portions of the support member are coupled with the pin member by means of screw-coupling or fitting. The coupling portions of the support member have slots which is formed in longitudinal directions thereof do that the slot provide elasticity to the coupling portions.

As an aspect of the present invention, the pin member includes a holding knot for preventing the cooking material from slipping down while the roasting material is cooked.

In the roasting spit according to the present invention, the pin member are separated from the support member. Therefore, the pin member can be coupled with the vertical coupling portion of the support member when cooking is performed. On the contrary, when the roasting spit is not used, the pin member can be coupled with the horizontal coupling portion. In result, when the pin member is distributed to consumers as a commercially available product, the roasting spit can be packed in a state that the pin member is coupled with the horizontal coupling portion, so as to guarantee a safe packing with less expense and as well greatly reduce the package size.

Moreover, the holding knot prevents the cooking roasting material stabbed with the pin member from slipping down while it is cooked.

BRIEF DESCRIPTION OF THE DRAWINGS

The above object and other advantages of the present invention will become more apparent by describing in detail a preferred embodiment thereof with reference to the attached drawings, in which.

DESCRIPTION OF THE PREFERRED EMBODIMENTS

Hereinafter, several preferred embodiments of the present invention will be described in detail with reference to the accompanying drawings, and like elements will be numbered the same in the following description.

Figure 1:
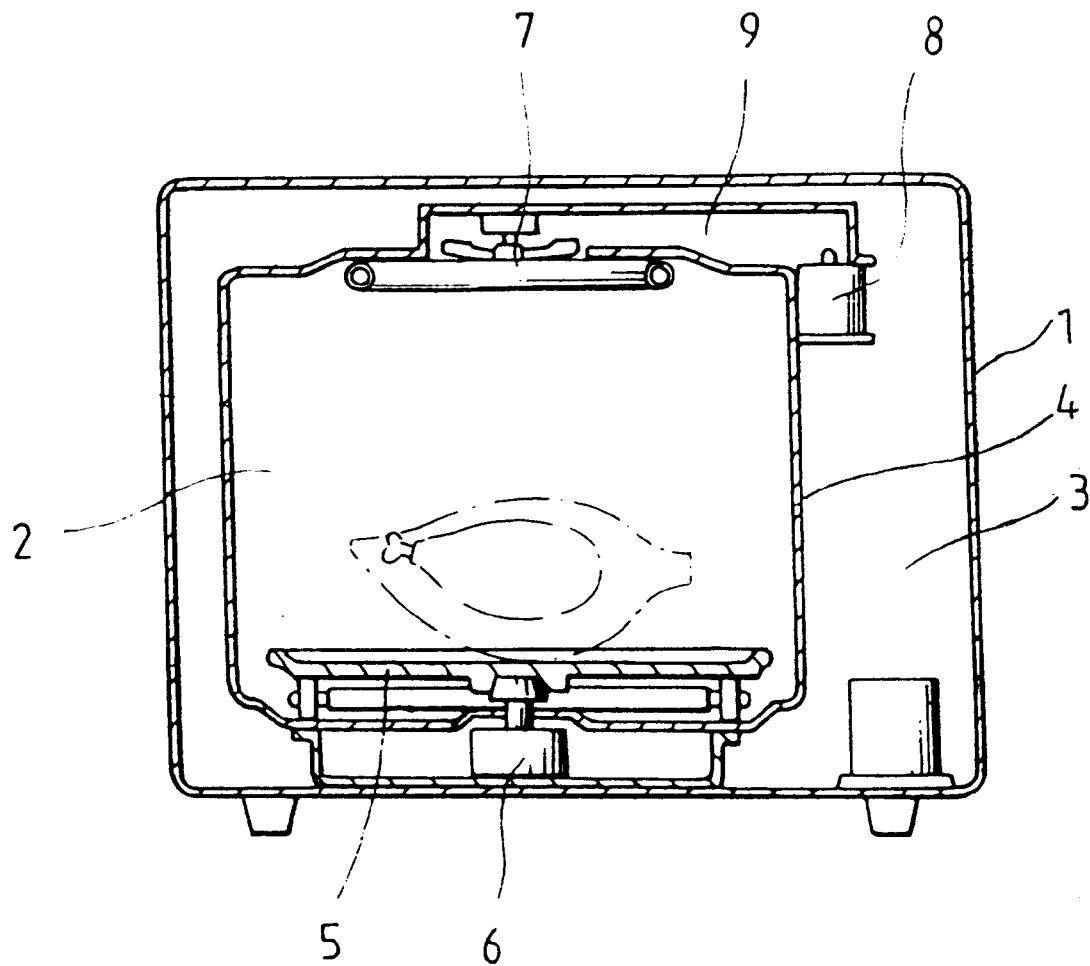
FIG. 1 is a schematic sectional view showing the inner construction of a conventional microwave oven.
Figure 2:
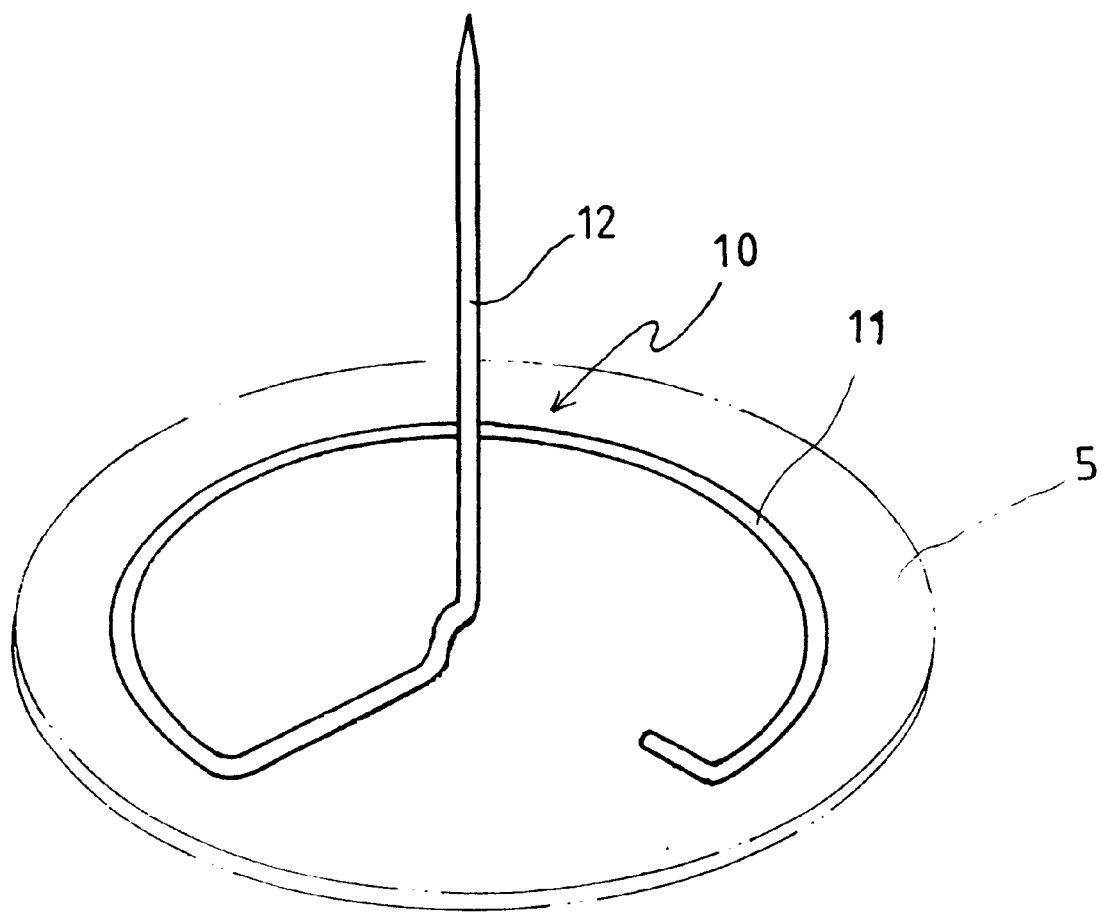
FIG. 2 is a perspective view showing a conventional roasting spit.
Figure 3:
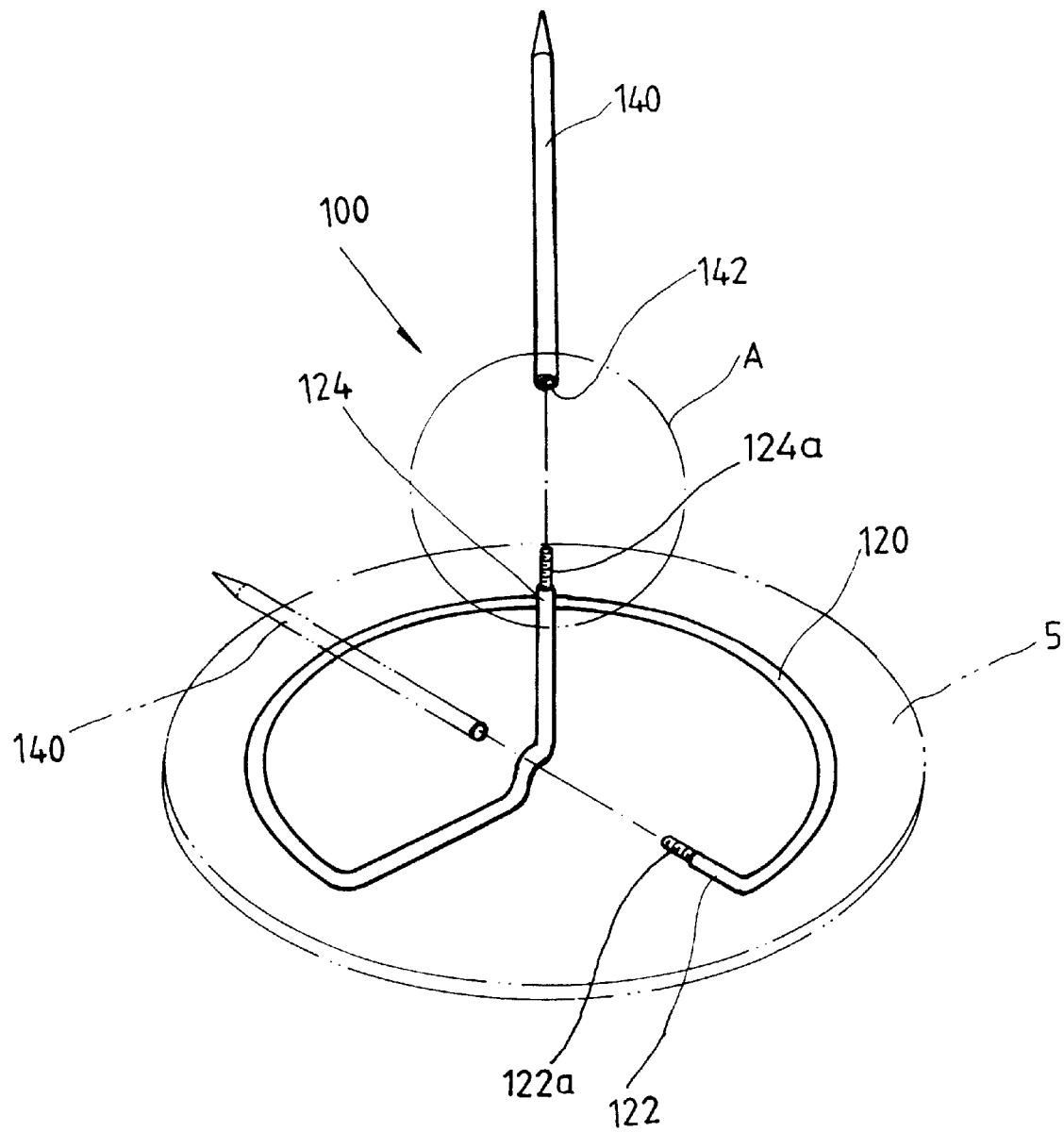
FIG. 3 is an exploded perspective view showing a roasting spit according to the first embodiment of the present invention.
Figure 4:
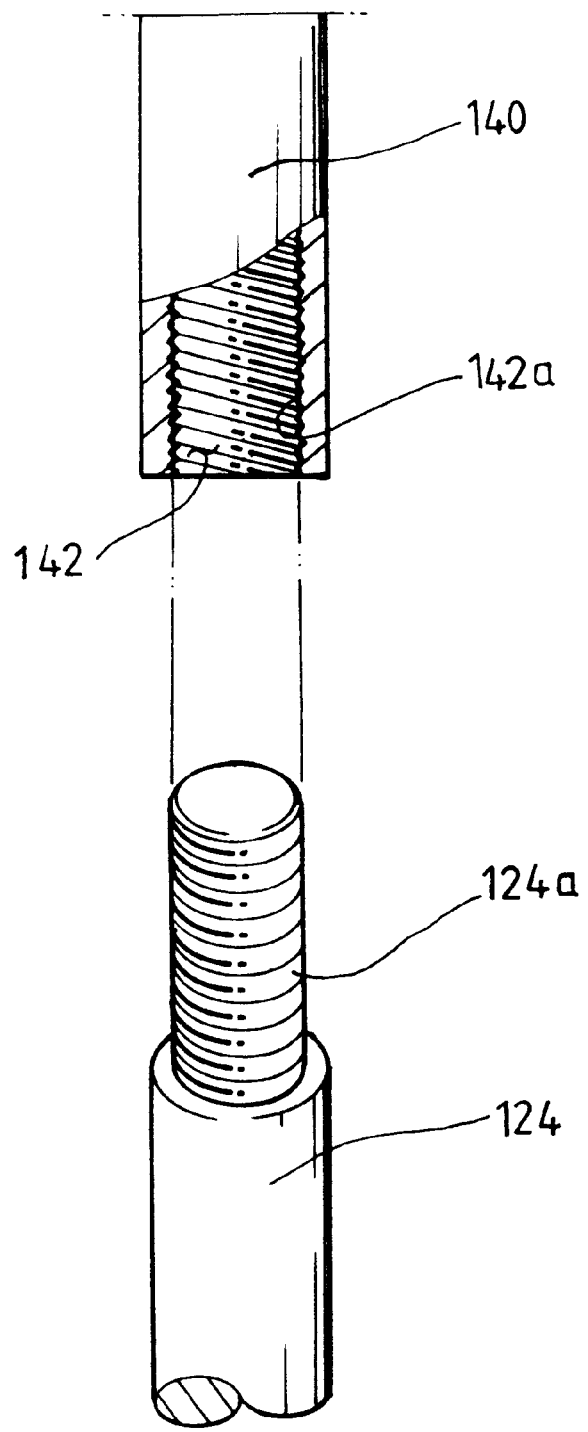
FIG. 4 is an enlarged exploded perspective view of A-portion in FIG. 3.

FIG. 3 and FIG. 4 show a roasting spit. 100 according to the first embodiment of the present invention. As shown, roasting spit 100 according to the first embodiment of the present invention includes a ring-shaped support member 120 and a pin member 140. Support member 120 is set on tray 5 in close contact therewith, and pin member 140 is coupled with support member 120 and hangs the roasting material to be roasted such as chicken by stabbing therethrough.

A horizontal coupling portion 122 is formed at one end of support member 120 to be bent toward the center of support member 120, and a vertical coupling portion 124 is formed at the other end of the support member 120 to be multi-bent upward. At the lower end of pin member 140 is provided with a coupling hole 142 to be selectively coupled with horizontal coupling portion 122 and vertical coupling portion 124. Referring to FIG. 4, horizontal coupling portion 122 and vertical coupling portion 124 of support member 100 are formed with male screws 122a and 124a, while coupling hole 142 of pin member 140 is formed with a female screw 142a.

Figure 6:
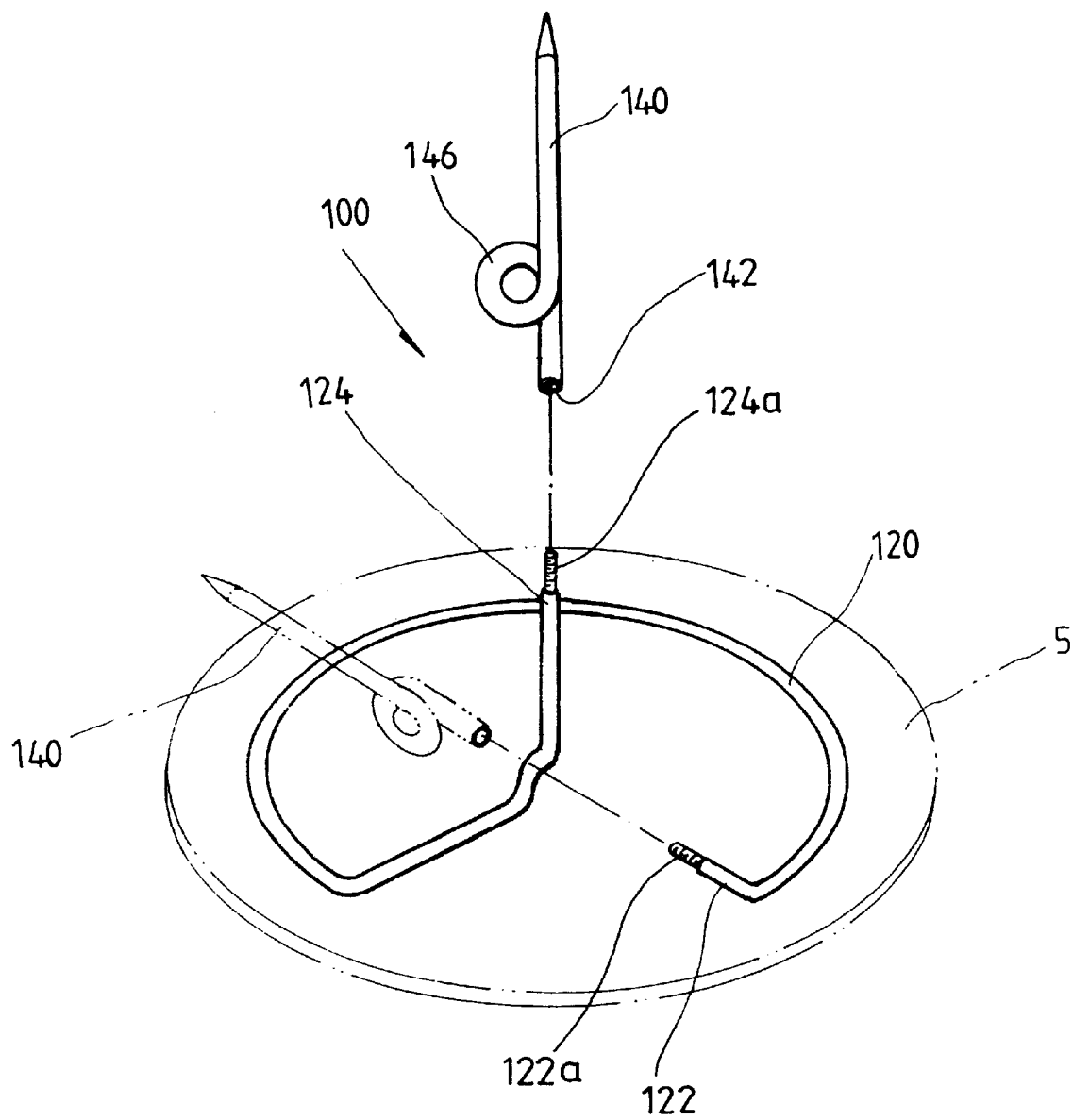
FIG. 6 is an exploded perspective view showing a roasting spit according to the third embodiment of the present invention.

According to the first embodiment of the present invention as described above, pin member 140 is coupled with vertical coupling portion 124 of support member 120 when cooking is performed, while in the contrary case, it can be coupled with horizontal coupling portion 122 of support member 120 to be kept with safety. That is possible since the pin member is shorter than a diameter formed by the ring-shaped support member 120, as can be seen in FIGS. 3 and 6.

As described above, in roasting spit 100 according to the first embodiment of the present invention, pin member 140 stabbed into the roasting material and support member 120 for supporting pin member 140 on tray 5 are separated from each other. Therefore, when roasting spit 100 is not used, pin member 140 can be coupled with horizontal coupling portion 122, so that it does not protrude upward, thereby preventing possible wound of the user. Further, also when pin member 140 is distributed to consumers as a commercially available product, roasting spit 100 can be packed in a state that pin member 140 is coupled with horizontal coupling portion 122, so as to guarantee a safe packing with less expense and as well greatly reduce the package size. The package size is significantly reduced, since the pin member is longer than the vertically extending portion of the spit, as can be seen in FIGS. 3 and 6.

In the first embodiment of the present invention as described above, horizontal coupling portion 122 and vertical coupling portion 124 of support member 120 are coupled in coupling hole 142 of pin member 140 by using screws formed on coupling portions 122 and 124. However, they can be coupled with each other not only by using above screw but also by another method such as fitting which is shown in FIG. 5.

The roasting spit according to the second embodiment of the present invention shown in FIG. 4 is similar to roasting spit 100 according to the first embodiment, and includes a ring-shaped support member 120 and a pin member 140. Support member 120 is set on tray 5 in close contact therewith, and it has horizontal coupling portion 122 and vertical coupling portion 124. Meanwhile, pin member 140 has coupling hole 142 to be selectively coupled with horizontal coupling portion 122 or vertical coupling portion 124.

Figure 5:
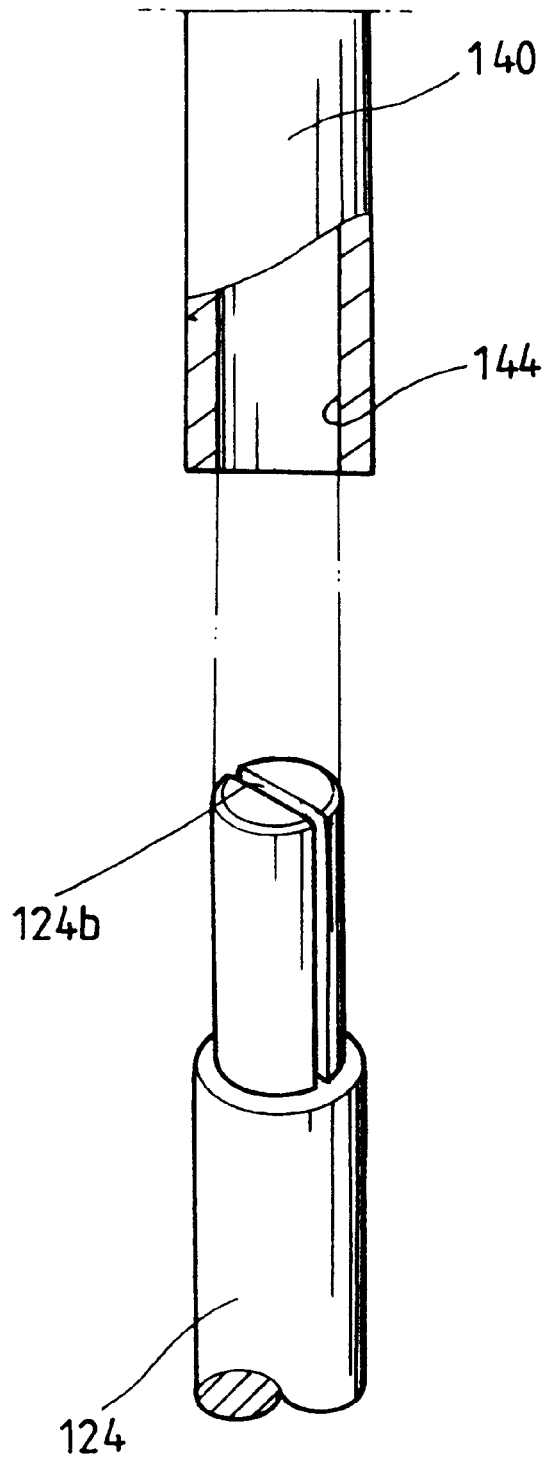
FIG. 5 is an enlarged exploded perspective view showing a coupling portion according to the second embodiment of the present invention.

Meanwhile, in the roasting spit according to the second embodiment of the present invention, as detailed illustrated in FIG. 5, horizontal coupling portion 122 and vertical coupling portion 124 of support member 120 are coupled with coupling hole 142 of pin member 140 by fitting. Horizontal coupling portion 122 and vertical coupling portion 124 of support member 120 respectively have a slot 124b formed at the middle of them and extending in the longitudinal direction thereof. Slot 124b allows horizontal coupling portion 122 and vertical coupling portion 124 to be coupled in coupling hole 142 of pin member 140 even if the diameter of horizontal coupling portion 122 and vertical coupling portion 124 is slightly larger than that of coupling hole 142, and provides elasticity for horizontal coupling portion 122 and vertical coupling portion 124.

The roasting spit according to the second embodiment of the present invention described above provides not only the same advantages and effect as the roasting spit according to the first embodiment but also a further advantage that coupling portions 122 and 124 of support member 120 can be coupled in coupling hole 142 of pin member 140 more easily in comparison with the screw-using method according to the first embodiment.

FIG. 6 shows a roasting spit according to a third embodiment of the present invention, which has a similar construction as the first embodiment shown in FIGS. 3 and 4. That is, in the third embodiment, roasting spit 100 includes a ring-shaped support member 120 and a pin member 140. Support member 120 is set on tray 5 in close contact therewith, and it has horizontal coupling portion 122 and vertical coupling portion 124. Meanwhile, pin member 140 has coupling hole 142 to be selectively coupled with horizontal coupling portion 122 or vertical coupling portion 124 by the screw-using method.

Meanwhile, in the third embodiment, roasting spit 100 further includes a holding knot 146 for preventing the roasting material from slipping down during the cooking. Holding knot 146 is formed by winding a lower portion of pin member 140.

Figure 7:
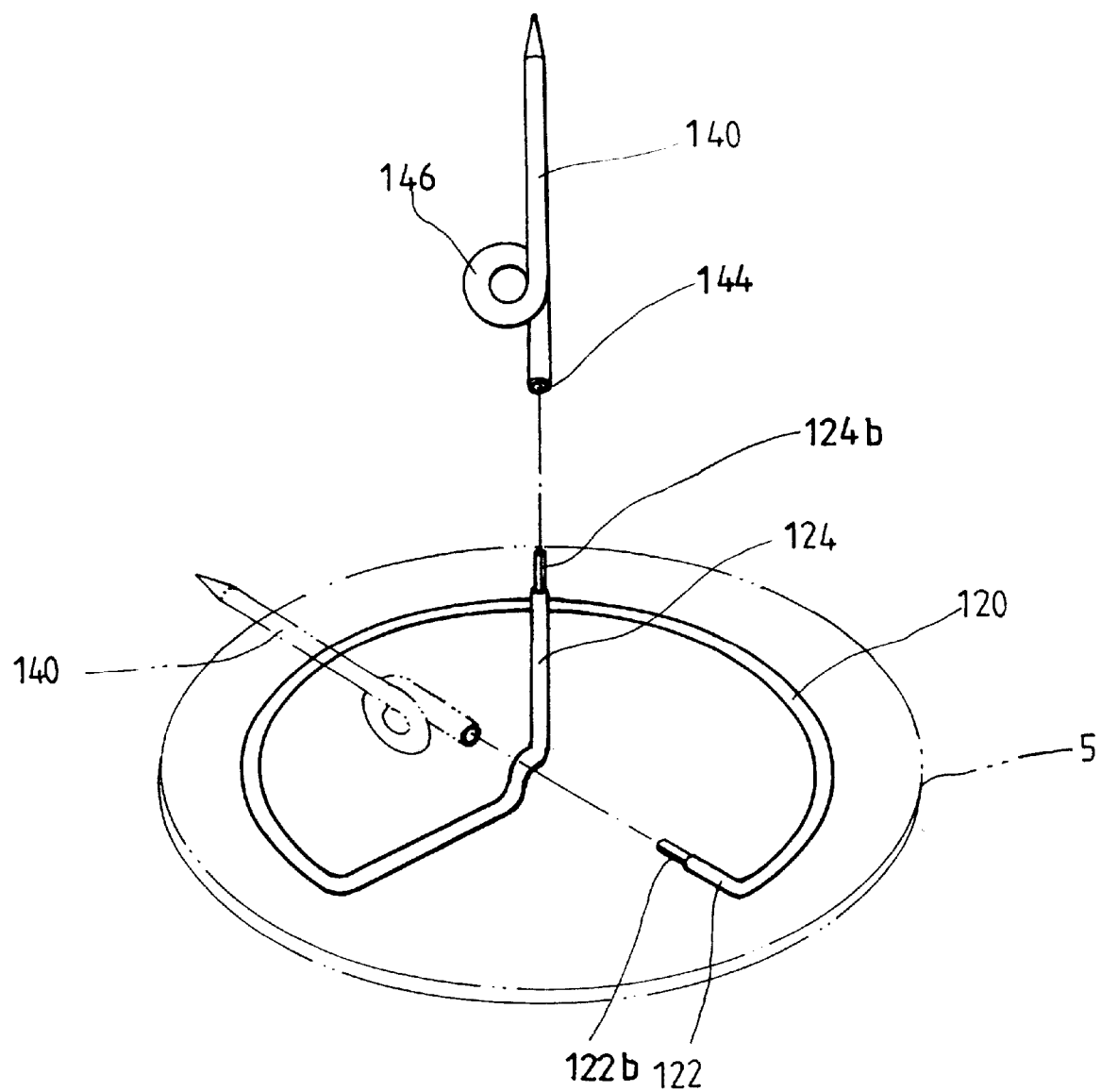
FIG. 7 is an enlarged exploded perspective view showing a roasting spit according to the fourth embodiment of the present invention.

In the meantime, FIG. 7 shows a fourth embodiment of the present invention, which has the same construction as the third embodiment, except that coupling portions 122 and 124 of support member 120 are coupled in coupling hole 142 of pin member 140 by fitting as is the same in the second embodiment.

Figure 8:
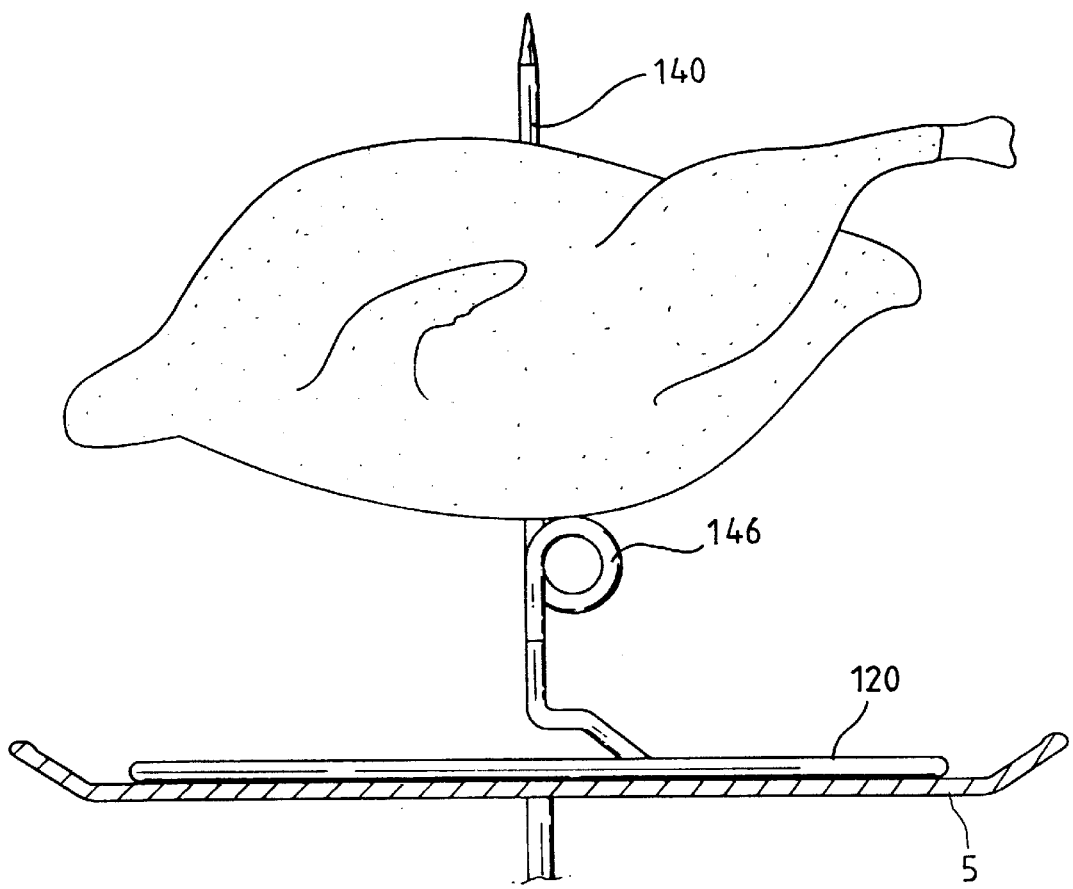
FIG. 8 is a view showing a state that the roasting spit stabbing a roasting material is disposed on a tray.

According to the third and fourth embodiments of the present invention as described above, the roasting material stabbed with the pin member is held by the holding knot as shown in FIG. 8, so that the roasting material is prevented from slipping down during the cooking.

Therefore, the third and the fourth embodiments provides an additional advantage further to those of the first and the second embodiments, in that the roasting material is prevented from slipping down during the cooking.

While the present invention has been particularly shown and described with reference to the particular embodiment thereof, it will be understood by those skilled in the art that various changes in form and detail may be effected therein without departing from the spirit and scope of the invention as defined by the appended claims.

What is claimed is:

1. A roasting spit for a microwave oven comprising:
   a generally ring-shaped support member adapted to be set on a tray and including a horizontal first coupling portion formed at one end thereof and directed toward a center of the support member, and a vertical second coupling portion formed at another end of the support member and directed upwardly; and
   a pin member for impaling food to be cooked, the pin member being provided with a point at one end thereof and a third coupling portion formed at another end thereof, the third coupling portion being releasably connectable to each of the first and second coupling portions, whereby the pin member constitutes a vertically extending food support when coupled to the first coupling portion, and lies in a plane of the generally ring-shaped support member when connected to the second coupling portion.

2. The roasting spit according to claim 1 wherein the first and second coupling portions are of substantially identical configuration.

3. The roasting spit according to claim 1 wherein each of the first, second and third coupling portions comprises a screw thread.

4. The roasting spit according to claim 1 wherein each of the first and second coupling portions comprises a screw-threaded projection, and the third coupling portion comprises a screw-threaded hole for receiving the projection.

5. The roasting spit according to claim 1 wherein each of the first, second and third coupling portions comprises a friction fit connector.

6. The roasting spit according to claim 5 wherein each of the first and second coupling portions comprises a projection, and the third coupling portion comprises a hole for receiving the projection; each of the projections including a slot extending in a longitudinal direction from an end of the projection to provide the projection with elasticity.

7. The roasting spit according to claim 1 wherein the pin member includes an enlargement intermediate its ends for limiting downward slippage of food during cooking.

8. The roasting spit according to claim 7 wherein the enlargement comprises a wound portion of the pin member.

9. The roasting spit according to claim 1 wherein the second coupling portion is disposed at an upper end of a vertically extending portion of the spit, the pin member being longer than the vertically extending portion.

10. The roasting spit according to claim 9 wherein the pin member is shorter than a diameter defined by the generally ring-shaped support member.

* * * * *